(12) United States Patent
Haywood et al.

(10) Patent No.: US 11,473,747 B1
(45) Date of Patent: Oct. 18, 2022

(54) LIGHT SYSTEM INCLUDING A LENS TEXTURE SHUTOFF

(71) Applicant: Valeo North America, Inc., Troy, MI (US)

(72) Inventors: Drew Haywood, Auburn Hills, MI (US); Colby Darlage, Auburn Hills, MI (US); Guilebaldo Munoz Ledo Espinosa, Auburn Hills, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 17/462,315

(22) Filed: Aug. 31, 2021

(51) Int. Cl.
  *F21S 41/40* (2018.01)
  *F21S 43/20* (2018.01)
  *F21S 41/20* (2018.01)

(52) U.S. Cl.
  CPC ............. *F21S 41/40* (2018.01); *F21S 41/285* (2018.01); *F21S 43/20* (2018.01)

(58) Field of Classification Search
  CPC ........... F21S 41/40; F21S 43/20; F21S 41/285
  USPC ......................................... 362/509, 520–522
  See application file for complete search history.

(56) References Cited

U.S. PATENT DOCUMENTS

| | | | |
|---|---|---|---|
| 5,486,991 A | 1/1996 | Bodem, Jr. | |
| 6,170,972 B1* | 1/2001 | Fukuhara | F21S 43/27 362/546 |
| 7,137,718 B2 | 11/2006 | Egashira | |
| 8,042,981 B2* | 10/2011 | Kotajima | F21S 41/43 362/520 |
| 8,628,226 B2* | 1/2014 | Takahashi | F21S 45/47 362/520 |
| 2002/0034078 A1* | 3/2002 | Natsume | F21S 43/50 362/543 |
| 2011/0149587 A1* | 6/2011 | Hayashi | B62J 6/055 362/520 |

* cited by examiner

*Primary Examiner* — Laura K Tso
(74) *Attorney, Agent, or Firm* — Young Basile Hanlon & MacFarlane, P.C.

(57) ABSTRACT

A light system including: (a) a first light region configured to provide a first light function; (b) a second light region configured to provide a second light function that is different from the first light function; (c) a blocker located between the first light region and the second light region so that when the first light function is activated, light from the first light region is prevented from passing to the second light region by the blocker and when the second light function is activated, light from the second light region is prevented from passing to the first light region by the blocker; (d) a textured surface in the first light region, the second light region, or both; and (e) a texture shutoff located between the textured surface in the first light region, the second light region, or both and located between the textured surface and the blocker so that the texture surface prevents material of the first light region, the second light region, the blocker, or a combination thereof from forming flash on an outside of the light system; wherein the blocker prevents light from only extending through the texture shutoff; and wherein the first light function and the second light function provide the light to a location around a vehicle that comprises the light system.

20 Claims, 4 Drawing Sheets

LIGHT SYSTEM INCLUDING A LENS TEXTURE SHUTOFF

FIELD

The present teachings relate to a light system providing two or more lighting functions with the two or more lighting functions each being provided adjacent to one another where light from a first lighting function is prevented from migrating to a region providing a second lighting function by a blocker and the blocker prevents hot spots in regions adjacent to the blocker.

BACKGROUND

Vehicles include many different types of lights. Some types of lights included on a vehicle are low beam headlights, high beam headlights, tail lights, turn signal lights, fog lights, running lights, or a combination thereof. Each of these lights extend out of an outer surface of a vehicle so that they provide light for the driver or provide notice to surrounding drivers. Each of these lights require a space to function and provide light. However, as more lights, longer lights, or both are provided there is less room for each of these lighting systems. Attempts have been made to incorporate multiple lights into a single region of a vehicle to promote compactness.

Examples of light systems may be disclosed in U.S. Pat. Nos. 5,486,991 and 7,137,718 both of which are expressly incorporated herein by reference for all purposes. Thus, there is a need for a light system where two or more lighting functions are incorporated adjacent to one another and one lighting function may operate without any light being visible through the adjacent lighting functions. There is a need for a system where light is prevented from bleeding though a texture shutoff region without extending through a textured region. There is a need for a system where each portion of the light system are visibly separate so that light from one does not illuminate another. It would be desirable to have a light system comprising a texture shutoff that prevents flash during the manufacturing and does not emit light without the light passing through a textured portion.

SUMMARY

The present teachings provide: a light system including: (a) a first light region configured to provide a first light function; (b) a second light region configured to provide a second light function that is different from the first light function; (c) a blocker located between the first light region and the second light region so that when the first light function is activated, light from the first light region is prevented from passing to the second light region by the blocker and when the second light function is activated, light from the second light region is prevented from passing to the first light region by the blocker; (d) a textured surface in the first light region, the second light region, or both; and (e) a texture shutoff located between the textured surface in the first light region, the second light region, or both and located between the textured surface and the blocker so that the texture surface prevents material of the first light region, the second light region, the blocker, or a combination thereof from forming flash on an outside of the light system; wherein the blocker prevents light from only extending through the texture shutoff; and wherein the first light function and the second light function provide the light to a location around a vehicle that comprises the light system.

The present teachings provide: a process of forming a light system comprising: (a) providing a first material forming a first light region comprising a textured portion and a texture shutoff; (b) providing the first material forming a second light region; (c) providing a second material forming a blocker between the first light region and the second light region so that light extending through the first region does not extend into the second region and vice versa; wherein the texture shutoff prevents flash from forming when the second material is added to the first material and the texture shutoff is located relative to the blocker so that light cannot extend through the first light region without also passing through the textured portion of the first light region; and wherein the first light function and the second light function provide light around a vehicle that comprises the light system.

The present teachings provide a light system where two or more lighting functions are incorporated adjacent to one another and one lighting function may operate without any light being visible through the adjacent lighting functions. The present teachings provide a system where light is prevented from bleeding though a texture shutoff region without extending through a textured region. The present teachings provide a system where each portion of the light system are visibly separate so that light from one does not illuminate another. The present teachings provide a light system comprising a texture shutoff that prevents flash during the manufacturing and does not emit light without the light passing through a textured portion.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project in a forward direction, rear direction, side direction, or a combination thereof. Preferably, the light system projects a light from an external surface of the vehicle to a location in front of the vehicle or at an angle relative to the front or rear of a vehicle. The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light systems may be multiple light systems stacked one above the other, side by side, or integrated into a single light system. The light system may have multiple smaller light systems or may perform with a plurality of light systems. The plurality of light systems may be located in one light system. The plurality of light systems may operate independently of one another such that one light system may not affect another light system or portion of the light system. The light of the vehicle may be two or more, three or more, or four or more light systems located adjacent one another.

The light sources function to produce light. The light source may be a device or a plurality of devices that create light and the light extends outward from the light source. The light source may produce a high beam, a low beam, a blending beam, a running light, a day time light, a turn signal, a brake light, or a combination thereof. The light source may be aimed for near light, far light, blending light that blends the far light and near light together, or a combination thereof. The light sources may have different functions. For example, one light source may provide a running light and another light source may be a turn signal or fog light. The light source may comprise a plurality of lights or may be a single light source within a set of light sources. The plurality of lights may be in one set or group of light sources. The light source may be a single light that projects light. In another example, a single light source may direct light to a first location (e.g., a first light guide). The light source may be directional light. The light source may have an emission that is a Lambertian emission or a narrow emission angle. The directional light source may concentrate light on a light guide, towards a light bar, a reflector, or a combination thereof. The light source may include a laser diode, glowing phosphor, filament bulb, a light emitting diode, a halogenated light, a xenon light, or a combination thereof. One light source may produce one light function and a second light source may produce a second light source.

The first light function and the second light function may be different functions. The first light function and the second light function may operate at the same time. The first light function and the second light function may operate at different times. The first light function and the second light function may be optically isolated. The first light function and the second light function may be mechanically connected. The first light function and the second light function may be located on a same side of a vehicle or adjacent sides of a vehicle. The first light function and the second light function may both be located in a front of a vehicle or in a rear of a vehicle. The first light function and the second light function may provide different colored lights. The first light function may be a high beam, low beam, brake light, or a daytime running light. The second light function may be a turn signal or a daytime running light. Each of the light functions may include an independent light source.

The light source may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes two or more, 3 or more, 4 or more, or 5 more light sources that produce light and combine together to form the light extending from the light system. The sets of light sources may include 10 or less, 7 or less, 5 or less, or 3 or less devices that produce light (e.g., each set may include 5 light sources or alternatively all of the sets when combined together may include 5 light sources or 2 light sources). For example, the set of light sources may be the contents of a single printed circuit board that perform a same lighting function and the set of light sources may be 5 light sources. The number of light sources in a part of the light may dependent upon a size of the region or a size illuminated. For example, a brake light may have two or more light sources and a turn signal may have a single light. Thus, the light source may be one or more lights, two or more lights, or three or more lights. The light source may be static. The light sources may be free of movement. The light source may be fixed. The light sources may be static and may be manually or physically adjusted so that the light sources are directed to a desired location. The light sources may be fixed and the light from the light source may be moved, bent, directed, or a combination thereof by optical elements or reflectors (e.g., a light guide). Each device of the light source may be turned on and off. The light source may be located within a light system at a location relative to a light guide. Each light guide may receive light from a single light source. The light sources may work together as a set of light sources to create light.

The set of light sources function to fill a light bar, a lens, an outer housing, an outer lens, or a combination thereof with light so that the light bar, lens, outer housing, or a combination thereof project light outward to perform some function. The set of light sources may be a single function (e.g., a high beam, a low beam, a blending beam, a running light, a day time light, a turn signal, a brake light, or a combination thereof). Each set of light sources may perform a single function. Preferably, some of the light systems may include two or more sets of light sources, three or more sets of light sources, or even four or more sets of light sources that provide two, three, or four functions respectively. Each of the sets of light sources may perform a different function or provide a different type of light. All of the lights within a set of light sources may provide the same light (e.g., color, color temperature, or wavelength). For example, one set of light sources may be yellow, orange, or red and a second set of light sources may be white (e.g., OEM white, off white, pure white, or crystal white (e.g., having a color temperature between 4300K and 6000K). The color, intensity, temperature, or a combination thereof may vary from set to set depending on the function of the set of light sources. For example, if one set of light sources is directed to a turn signal then the color may be orange whereas if the set of light sources is for a brake light then the color may be red. The light from the light system may be directed to a predetermined location depending on a function of the light from that set of light sources. For example, a running light may be directed outward in front of a vehicle whereas a turn signal may be directed at a 45 degree angle so that a portion of the light is visible in a front of the vehicle and a portion of the light is visible from a side of the vehicle.

Each of the set of light sources may direct light on a first side and a second side of an optical axis. Some of the light may extend on an inboard side of the optical axis (e.g., in a direction towards a center of a vehicle). Some of the light may extend on an outboard side of the optical axis (e.g., in a direction away from a center of a vehicle). The light may extend farther on an outboard side than an inboard side of a light. The light on the inboard side may illuminate a region between two light sources and in front of a vehicle. A right-handed light and a left-handed light may each include light that extends inboard (e.g., on an inboard side) so that the inboard lights overlap and illuminate in front of a vehicle. A right-handed light and a left-handed light may each include light that extends outboard (e.g., on an outboard side) of a vehicle so that the outboard light illuminates a region outside of the vehicle, sides of a road, or both. The light from each of the light sources may extend outward from the light source at an angle towards an inboard side and an outboard side. Each of the sets of light sources or functions of the light sources may be spaced apart by an axis. For example, a first function may extend along a first side of the axis and a second function may extend along a second side of the axis. An angle the light extends on an inboard side and an outboard side of the optical axis may be varied based on a shape of a reflector.

The light from the first light function and the light from the second light function may extend through a lens. The first light function and the second light function may have discrete lenses that are spaced apart. The first light function and the second light function may have mechanically connected lenses. The first light function and the second light function may have optically separated lenses. The first light function and the second light function may each have a lens with a clear portion, a textured portion a texture shutoff, a portion of a blocker, or a combination thereof. The first light function and the second light function may each have one or more lenses (e.g., internal lenses).

The one or more lenses function to direct the light from the reflectors to a location to be illuminated. The lenses may function to protect the light emitting portion. The lenses may bend light. The lenses may refract light. The lenses may diffuse the light, blend the light, spread the light, direct the light to a predetermined location, create one or more hot spots, create a homogeneous lighting appearance, prevent hot spots, or a combination thereof. The lens may be located in front of the light emitting portion. The lenses may cover all or a portion of the light system, the light source, light bars, or a combination thereof. Each light system may include a lens. The light system may include a single lens that covers each of the light bars or light sources that each provide or perform a different function. The lens may cover the light bar or light source so that light, direct light, reflected light, or a combination thereof extends through the lens. The lens may be one or more lenses. The lens may be a plurality of lenses. The lens (e.g., primary lens or internal lens) may be a single lens. The one or more lenses may have a shape that directs light to a predetermined location. The one or more lenses may be flat, planar, bio-convex, plano-convex, positive meniscus, negative meniscus, plano-concave, bio-concave, double convex, converging, diverging, or a combination thereof. Each lens may be a single lens. Each lens may be a compound lens (e.g., there may be more than one lens). Each lens has a forward side (or forward surface) and a rearward side (or rearward surface). The lenses may change a color or wavelength of the light extending through the lens. For example, the light source may generate white light and the white light may be converted into orange light as the light extends through the lens. The lens may include one or more texture portions.

The texture portions function to prevent hot spots, provide a homogenous light pattern, a homogenous amount of light, spread the light, or a combination thereof. The textured pattern may provide a homogenous lighting appearance when the light is viewed from an external location of a vehicle, an internal location of a vehicle, or both. The texture portion may be added to a lens. For example, a texture may be sprayed on the lens, etched into the lens, mechanically added, mechanically formed, or a combination thereof. The textured portions may be on an external surface, an internal surface, a location between the internal surface and the external surface, or a combination thereof. The texture portions may be formed while the lenses are being formed. Some lenses may include a texture portion on or in an external surface and an internal surface. The texture portions on opposing surfaces may extend in a substantially parallel direction, in a direction complementary to a shape of the lens, or both. The texture portion may have a shape that is a pyramid, half circle, square, rectangle, zig zag patterns, lines, cylindrical, tetrahedron, cube, hexagonal, icosahedron, a prism, a pentagonal pyramid, a cone, cuboid, a symmetrical shape, an asymmetrical shape, a geometric shape, a non-geometric shape, or a combination thereof. The textured portion may form an outer surface or a lens. The textured portion may extend substantially a length, a width, or both of the lens. For example, the textured portion may terminate at a texture shutoff such that the textured portion does not extend the length and/or width of the textured shutoff. The textured portion may be the only portion of the lens that light extends through. The textured portion may be free of hot spots. The textured portion may be free of contact with a blocker. The textured portion of a lens may stop before a blocker. A portion of the blocker may extend behind the textured portion but may be free of contact. The textured portion may terminate at a texture shutoff.

The texture shutoff functions to be a terminal edge of the textured portion. The texture shutoff may be free of any texture or may gradually eliminate the texture. The texture shutoff may be in communication with a blocker. The texture shutoff may create a space between a blocker and a textured portion. The texture shutoff may form a border around all or a portion of the textured portion. The texture shutoff may provide a complementary surface that the blocker may contact the lens. The texture shutoff may be formed in a first step (or shot) and the blocker may be formed in a second step (or shot). The texture shutoff may have a sufficient thickness (e.g., width) that the final part including the blocker is commenced and is free of excess material (e.g., flash). The texture shutoff may provide a molding surface that may be sufficiently smooth, sufficiently wide or thick, sufficiently connected, sufficiently gripped, sufficiently held in place with a mold, or a combination thereof that the texture shutoff prevents material from escaping the mold while the blocker is being formed. The texture shutoff may have width or thickness of about 0.1 mm or more, about 0.2 mm or more, about 0.3 mm or more, about 0.4 mm or more, or about 0.5 mm or more. The texture shutoff may have width or thickness (e.g., a distance between the textured portion and the blocker) of about 5 mm or less, about 4 mm or less, about 2 mm or less, about 1 mm, or less, or about 0.75 mm or less (e.g., ±0.05 mm). The texture shutoff may be free of any texture so that material may not escape the mold through the texture. The texture shutoff may be generally clear. The texture shutoff may be made of a same material as the textured portion. The texture shutoff may be coplanar with the textured portion, the blocker, or both (e.g., an internal surface or an external surface). The texture shutoff may form a non-textured clear portion of a lens.

The clear portion may function to connect the lens to a blocker, prevent overshoot or flash, be free of accepting light, be free of directly projecting light, or a combination thereof. The clear portion may only receive light if the light passes through a textured portion first or emit light only if the light passes through a textured portion second. The clear portion and the texture shutoff may be commensurate in size and shape. The clear portion may be smaller than the texture shutoff a portion of the texture shutoff may gradually phase out the textured portion. The clear portion may be partially or completely obscured by the blocker, a body portion of the blocker, a leg of the blocker, or a combination thereof. The clear portion (i.e., a portion of the texture shutoff without any texture) may have a complementary shape to the blocker, a body portion of the blocker, a leg of the blocker, a step of the blocker, or a combination thereof. The clear portion may form a recess that is complementary in shape to the step of the blocker.

The recess functions to receive the step of the blocker, obscure a portion of the clear portion of the texture shutoff behind the leg or the step of the blocker, or both. The recess may function to receive material of the blocker so that the blocker forms a step, blocks, light, blocks light within the clear portion, or a combination thereof. The recess may assist in minimizing an amount of blocker present at a forward most surface of the device, external surface, surface facing outward, or a combination thereof. The recess may minimize an amount of visible blocker. The recess may minimize an amount of exposed blocker while allowing the blocker to mushroom out after the recess via steps and legs. The recess may provide a contoured shape of the clear portion so that the clear portion does not extend in a straight line, a line of light, a line of sight, or a combination thereof. The recess may include angles, curves, angled portions, straight portions, curved portions, extend at an angle relative to the external surface, or a combination thereof. The recess may receive a portion of the blocker and all or a portion of the blocker may sit within the recess.

The blocker functions to prevent light from extending from first lens to a second lens, a first light function to a second light function, or vice versa. The blocker may prevent a light pipe from being formed between a first light function and a second light function or vice versa. The blocker may substantially block light from extending between the first light function and the second light function. The blocker may prevent 99% or more or even 100% of the light in the first light function extending into the second light function and vice versa. The blocker may create a barrier between a first light source and a second light source so that light is only directed along a respective side of a blocker. The blocker may extend beyond the first lens, the second lens, or both. The blocker in addition to blocking light between light functions or lenses may also block light from extending out of the lenses through the texture shutoff or the clear portions.

The blocker may cover a straight line of sight of the texture shutoff. The blocker may prevent light from only passing through the texture shutoff (i.e., light will pass through a textured region before extending out of the lens). The blocker may extend at an angle such that any light extending out of a lens passes through at least one textured portion before passing out of the lens. The blocker and the texture shutoff may have a complementary non-linear shape such that no portion of the texture shutoff is linear between opposing edges of a lens (e.g., an exterior surface and an interior surface). The blocker may create a torturous path for light such that any light passing out of the lens passes thought a textured portion and cannot pass only through a clear portion of the texture shutoff.

The blocker may be made of a material that is completely opaque. The blocker may be made of a material that is black. The blocker may be made of a polycarbonate (PC), acrylic, polypropylene (PP), acrylonitrile butadiene styrene (ABS), poly(methyl methacrylate (PMMA), or a combination thereof. The blocker may be added after the first lens, the second lens, or both. The blocker may extend behind a portion of the clear portion, the textured portion, the texture shutoff, or a combination thereof. The blocker may have a front width (e.g., at an exterior surface) and a rear width (e.g., at an interior surface or beyond an interior of the lenses). The front width may be less than the rear width. The rear width may have a distance that is about 1.1× or more, 1.2× or more, 1.3× or more 1.5× or more, 1.7× or more, or about 2× or more a distance of the front width. The rear width may have a distance that is about 5× or less, 4× or less, 3× or less, or 2× or less the distance of the front width. The blocker may include a central portion that forms a body portion of the blocker.

The body portion functions to block light from extending between a first light function and a second light function. The body portion may extend to an exterior surface of the lenses, the light system, of both. The body portion may extend to an interior surface, beyond an interior surface, or a combination of both. The body portion may have a portion that extends from a surface (e.g., an inward surface) cantilevered. The body portion may form a segregation between two lights or light sources. A portion of the body portion may extend outwardly between the two lights or the two light sources. The body portion may have a first width on a first side and a second width on a second side. The second with may be greater than the first width. The width of the blocker may be increased by one or more legs extending from the body portion.

The one or more legs function to block light. The one or more legs function to prevent light from extending through a texture shutoff or a non-textured portion of a texture shutoff (e.g., clear portion) without passing through a textured portion. The one or more legs may extend from the body portion at an angle. The one or more legs may be a curved portion extending from the body portion. The one or more legs may include one or more curves, two or more curves, a bulbous portion, one or more angles, two or more angles, three or more angles, one or more changes in direction, two or more changes in direction, or a combination thereof. The one or more legs may form a point, a peak, a half circle, a square, a rectangle, a triangle, or a combination thereof. The one or more legs may include one or more steps that form a shape in the leg.

The one or more steps function to form a plateau in a leg, create a tortuous path, block light so that light cannot extend through a clear portion of a texture shutoff, mirror a shape of the texture shutoff, or a combination thereof. The one or more steps may increase a width of the blocker. The one or more steps may be one or more angles or changes direction of a leg. The one or more steps may extend around a recess, form a recess, be complementary in shape to a recess, or a combination thereof. The one or more steps may form a plateau that extends the blocker outward such that a line of light cannot extend through only a clear portion without being blocked or extending through a textured portion. The steps may form a shape in the leg as the leg extends outward from the body. The steps may prevent an angle of light from extending directly through a clear portion of a texture shutoff.

The angle of light is a direction the light travels from the light source to a location outside of the light system and the vehicle. The angle of light travels in a straight line except when the light changes direction due to a reflector or a refracting off of another object. The angle of light extends generally in a straight line through lens. The blocker is configured such that the angles of light cannot extend directly through only a clear portion of a texture cutoff. The angle of light may be blocked so that the light either hits the blocker or extends around the blocker through a textured portion. The angle of light may extend through a textured portion of the lens and then out an outer lens.

The outer lens or lens may function to protect the light system, house all of the internal components, or both. The lens (e.g., outer lens) may be an outer most part of a light system. The lens may receive all of the light from the lenses to be directed outward from the vehicle, in a direction of movement of a vehicle or, both. The lens may be sufficiently strong to protect the light system from rocks and debris as the vehicle moves. The lens may cover all of the light sources, all of the light bars, all of the light sources, or a combination thereof of the light system (e.g., a first light bar, a second light bar, or a third light bar). The lens may be transparent so that light may extend through the outer lens. The lens may cover the light bars and the blockers.

Figure 1:
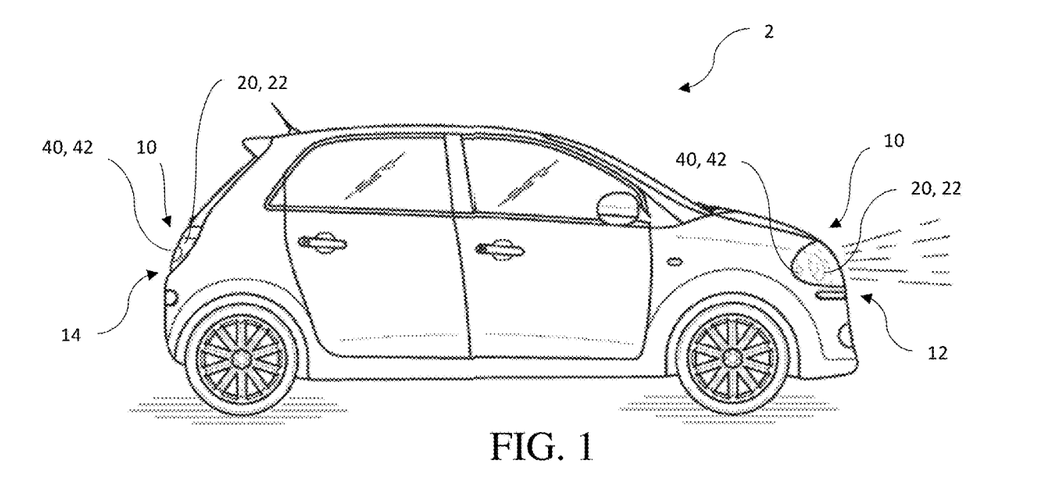
FIG. 1 is a side view of a vehicle including a front light system and a rear light system.

FIG. 1 illustrates a side view of a vehicle 2 including light systems 10. The light systems 10 includes a front light system 12 and a rear light system 14. The front light system 12 includes a first light function 20 that is shown as a head light 22 and a second light function 40 that is shown as a turn signal 42. The rear light system 12 includes a first light function 20 that is shown as a tail light 22 and a second light function 40 that is shown as a turn signal 42.

Figure 2:
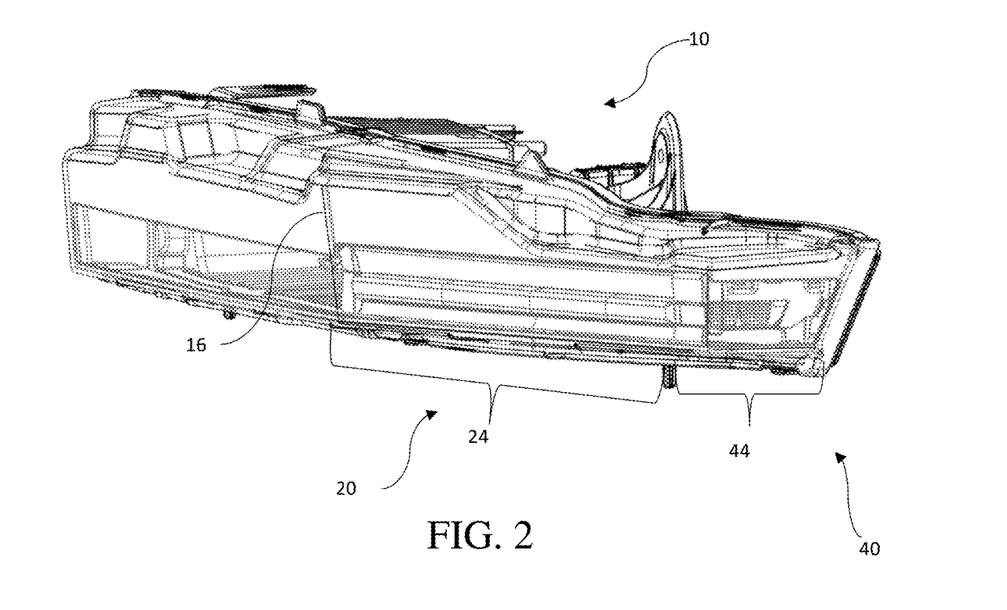
FIG. 2 is a front isometric view of a light system including multiple lighting functions.

FIG. 2 is an isometric view of a light system 10 including a first light function 20 and a second light function 40. The first light function 20 provides light through a first light region 24 and the second light function 40 provides light through a second light region 44. As shown, the first light function 20 is a turn signal and the second light function 40 is a side marker light.

Figure 3:
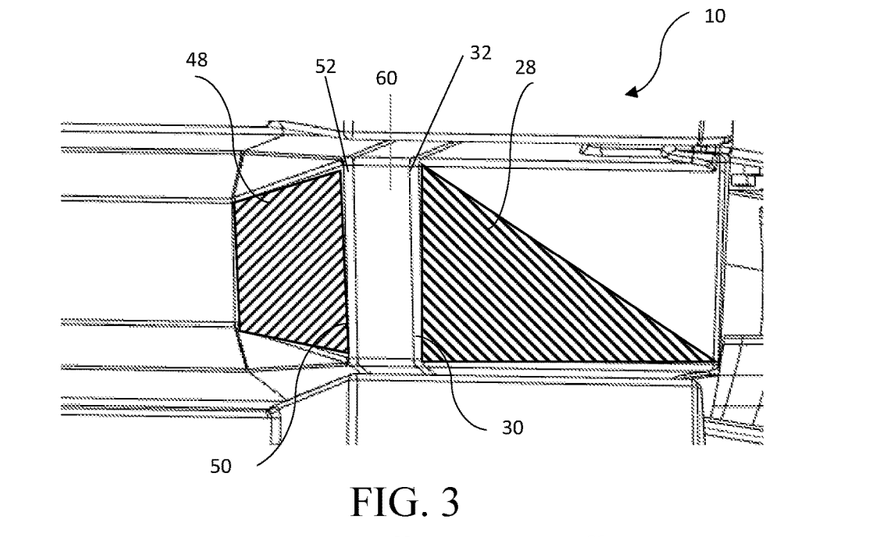
FIG. 3 is front view of a light system with a plurality of lighting functions.

FIG. 3 illustrates the structure of the light system 10. The light system 10 includes a first textured portion 28 separated from a blocker 60 by a texture shutoff 32. The texture shutoff 32 is free of any texture and is generally a clear lens 30. A second side of the blocker 60 is spaced apart from a second textured portion 48 by a second texture shutoff 52 that is a generally clear lens 50.

Figure 4:
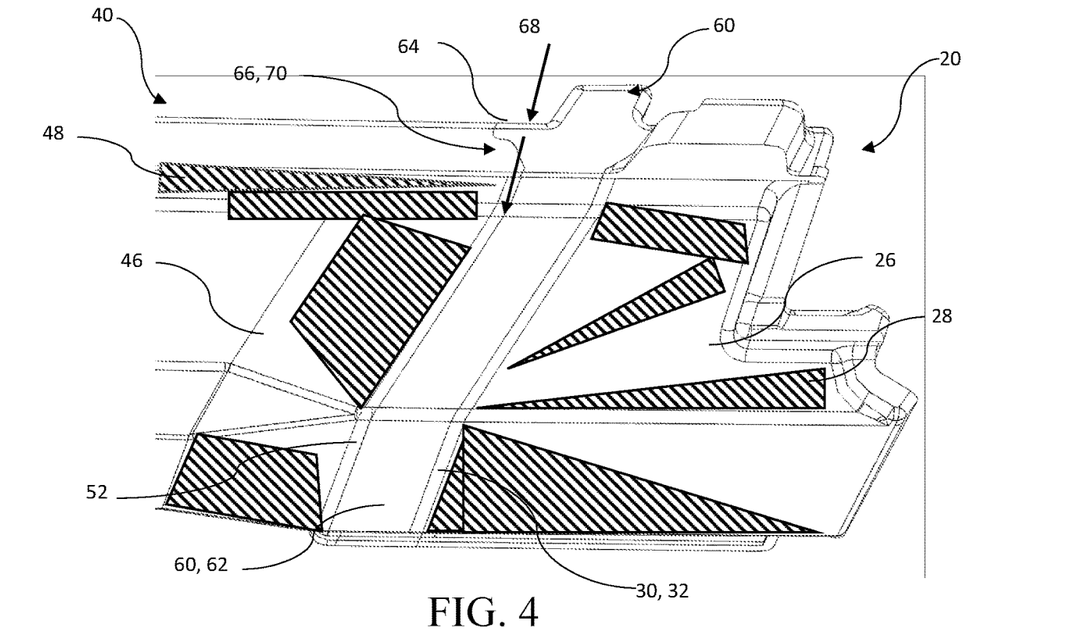
FIG. 4 is a top isometric view of the plurality of lighting functions separated by a blocker and texture shutoffs.

FIG. 4 is a top isometric view of the first light function 20 and the second light function 40 spaced apart by a blocker 60. The first light function 20 has a first lens 26 that has a plurality textured portions 28. The second light function 40 has a second lens 46 that has a plurality of textured portions 48. The blocker 60 includes a body portion 62, a leg, 64 and a step 66. The leg 64 includes a step 66 that aligns the blocker 60 in an angle of light 68 that could hit a clear portion 50 of the texture shutoff 52 if the leg 64 did not extend into the path of the light. As illustrated, the only place that light could extend through the second lens 46 at a clear portion 30 is blocked by a leg 64 of the blocker 60 so that light can only extend through textured portions 48 (this is the same as the first lens 26 although not illustrated).

Figure 5A:
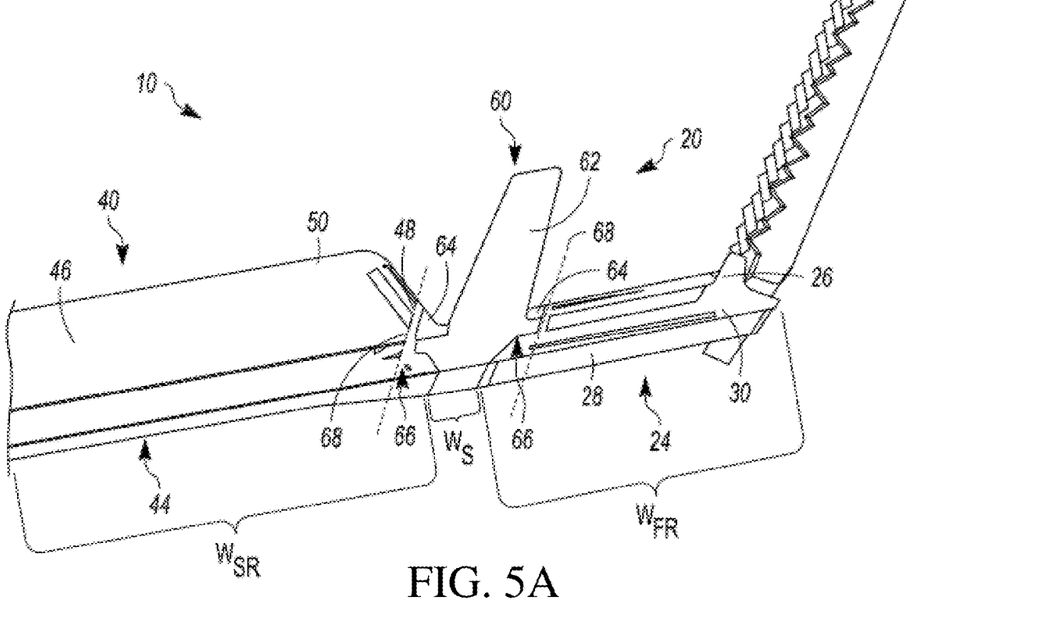
FIG. 5A is a cross-sectional view of the light system of FIG. 3 with a plurality of lighting functions.

FIG. 5A is an isometric view of a light system 10 comprising a first light function 20 and a second light function 40. The first light function 20 includes a first light region 24 including a first lens 26 having a textured portion 28 that includes a clear portion 30. The first light region 24 has a width ($W_{FR}$). The second light function 40 includes a second light region 44 including a second lens 46 having a textured portion 48 that includes a clear portion 50. The second light region 44 has a width ($W_{SR}$). A blocker 60 is located between and connects the first lens 26 and the second lens 46. The blocker 60 includes a body portion 62 have a width ($W_S$) at a forward end. Legs 64 extend outward from the body portion 62. Each of the legs 64 have a step 66 that extend into an angle of light 68 such that light from the first light function 20 and light from the second light function 40 cannot extend into the clear portions 30 and 60 respectively.

Figure 5B:
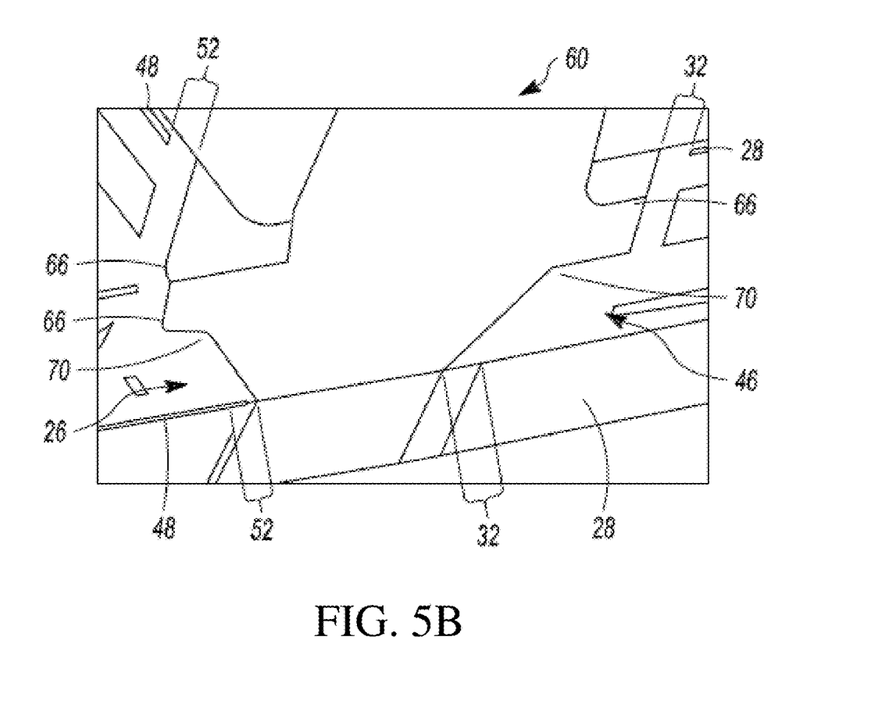
FIG. 5B is a close-up view of the texture shutoff of FIG. 5A.

FIG. 5B is a close-up view of the blocker 60 of FIG. 5A. The blocker 60 includes a pair of steps 66 that include a recess 70 behind the steps 66 that mirror the shape of the steps so that steps 66 prevent light from extending into the texture shutoff 32 of the first lens 26, the texture shutoff 52 the second lens 46, or both. The blocker 60 is spaced apart from a first textured portion 28 by a first texture shutoff 32 on a forward side and a rearward side. The blocker 60 is spaced apart from a second textured portion 48 by a second texture shutoff 52 on a forward side and a rearward side so that the surface is free of flash (e.g., excess material).

Figure 6A:
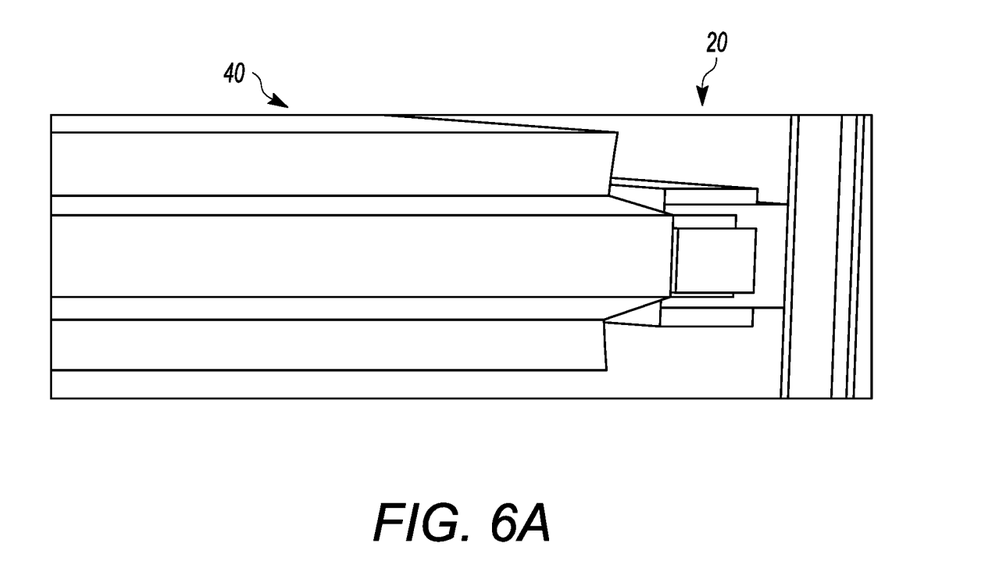
FIG. 6A illustrates a light having a plurality of lighting functions without a texture shutoff and blocker.

FIG. 6A illustrates a first light function 20 and a second light function 40 with no blocker so that light bleeds from the first light function 20 into the second light function 40.

Figure 6B:
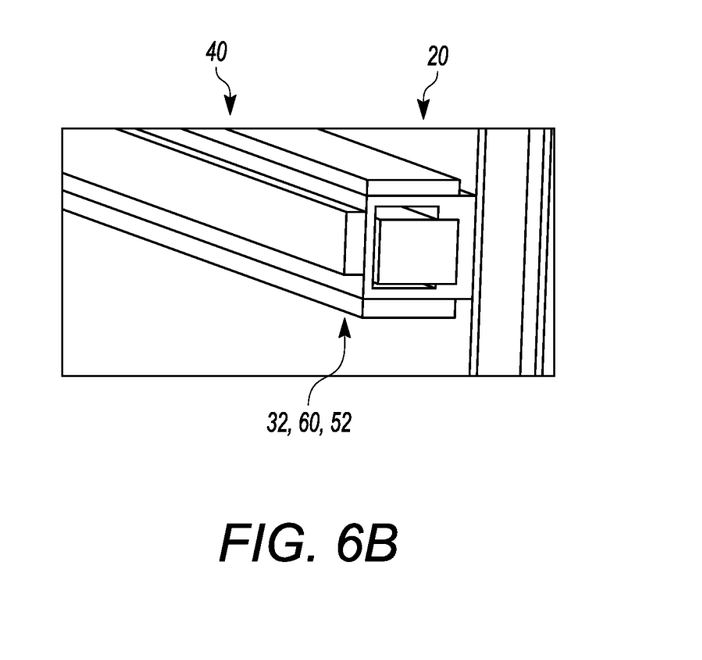
FIG. 6B illustrates a light having a plurality of lighting functions separated by a blocker and texture shutoffs.

FIG. 6B illustrates a first light function 20 spaced apart from a second light function 40 by a first texture shutoff 32, a blocker 60, and then a second texture shutoff 62. As show, the light is maintained in the first light function 20 and there are no hot spots. The light appears to be substantially homogeneous throughout the first light function 20.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
10 Light System
12 Front Light System
14 Rear Light System
16 Outer Lens
20 First Light Function
22 Headlight/Taillight
24 First Light Region
26 First Lens
28 Textured Portion
30 Clear Portion
32 Texture Shutoff
40 Second Light Function
42 Turn Signal
44 Second Light Region
46 Second Lens
48 Textured Portion
50 Clear Portion
52 Texture Shutoff
60 Blocker
62 Body Portion
64 Leg
66 Step
68 Angle of Light
70 Recess
WB Width of Texture Shutoff
WFR Width of First Region
WSR Width of Second Region

We claim:
1. A light system comprising:
a. a first light region configured to provide a first light function;
b. a second light region configured to provide a second light function that is different from the first light function;
c. a blocker located between the first light region and the second light region so that when the first light function is activated, light from the first light region is prevented from passing to the second light region by the blocker and when the second light function is activated, light from the second light region is prevented from passing to the first light region by the blocker;
d. a textured surface located in at least one of the first light region and the second light region; and
e. a texture shutoff located between the textured surface in at least one of the first light region and the second light region and located between the textured surface and the blocker so that the texture shutoff prevents material of at least one of the first light region, the second light region, and the blocker from forming flash on an outside of the light system;
wherein the blocker prevents light from only extending through the texture shutoff; and
wherein the first light function and the second light function provide the light to a location around a vehicle that comprises the light system.

2. The light system of claim 1, wherein the blocker includes a body portion and one or more legs.

3. The light system of claim 2, wherein the one or more legs are a first leg on a first side of the body portion and a second leg on a second side of the body portion.

4. The light system of claim 2, wherein the one or more legs include one or more steps that extend outward into at least one of the first light region and the second light region to prevent light from passing through the texture shutoff without also passing through the textured surface.

5. The light system of claim 4, wherein a recess is formed behind at least one of the one or more legs in a first lens and a second lens.

6. The light system of claim 4, wherein the one or more steps extend outward from the body portion at an angle that is sufficiently large that the steps prevent light from extending at an angle only through the texture shutoff.

7. The light system of claim 1, wherein the texture shutoff is a clear portion that forms a terminal edge of the textured surface.

8. The light system of claim 7, wherein the texture shutoff is sufficiently large that the flash is prevented on at least one of an interior surface and an exterior surface of the light system.

9. The light system of claim 1, wherein an exterior surface of the blocker is coplanar with an exterior surface of the first light region and the second light region.

10. The light system of claim 9, wherein a portion of the blocker that is coplanar is free of any overshoot or excess material.

11. The light system of claim 1, wherein the blocker has a step that extends at an angle of about 30 degrees or more and about 75 degrees or less relative to at least one of an exterior surface of the first light region and the second light region.

12. The light system of claim 2, wherein the blocker has a step with a rounded portion that protrudes outward from the body portion of the blocker.

13. The light system of claim 1, wherein an exterior surface of the blocker has a width that is less than an interior surface of the blocker.

14. The light system of claim 1, wherein the textured surface is located in at least one of the first light region and the second light region in areas proximate to at least one of an interior surface, an exterior surface, a first edge located between and connecting the interior surface and the exterior surface, and a second edge located between and connecting the interior surface and the exterior surface.

15. The light system of claim 14, wherein the textured surface extends substantially entirely along at least one of the interior surface and the exterior surface of the first light region and the second light region.

16. The light system of claim 15, wherein the texture shutoff is an only portion of the first light region and the second light region along at least one of the interior surface and the exterior surface that is free of the textured surface.

17. The light system of claim 1, wherein the textured surface is integrally molded into the first light region and the second light region.

18. The light system of claim 2, wherein the one or more legs extend at an angle from an exterior surface towards an interior surface into the texture shutoff so that the texture shutoff complements the shape of the one or more legs.

19. A process of forming a light system comprising:
 a. providing a first material forming a first light region comprising a textured portion and a texture shutoff;
 b. providing the first material forming a second light region;
 c. providing a second material forming a blocker between the first light region and the second light region so that light extending through the first region does not extend into the second region and vice versa;
 wherein the texture shutoff prevents flash from forming when the second material is added to the first material and the texture shutoff is located relative to the blocker so that light cannot extend through the first light region without also passing through the textured portion of the first light region; and
 wherein the first light function and the second light function provide light around a vehicle that comprises the light system.

20. The process of claim 19, further comprising a step of forming one or more legs when forming the blocker.

* * * * *